United States Patent [19]

Harrison

[11] Patent Number: 4,676,907

[45] Date of Patent: Jun. 30, 1987

[54] BIOLOGICAL FILTRATION PROCESS

[76] Inventor: George C. Harrison, 32 Mid Oaks La., Roseville, Minn. 55113

[21] Appl. No.: 740,242

[22] Filed: Jun. 3, 1985

Related U.S. Application Data

[63] Continuation-in-part of Ser. No. 576,209, Feb. 2, 1984, abandoned.

[51] Int. Cl.$^4$ .................................................. C02F 3/04
[52] U.S. Cl. ...................................... 210/617; 210/150; 210/502.1; 502/413; 502/437
[58] Field of Search ............... 210/694, 617, 618, 616, 210/150, 151, 502.1, 509, 903; 502/437, 413

[56] References Cited

U.S. PATENT DOCUMENTS

| | | | |
|---|---|---|---|
| 1,543,763 | 6/1925 | Gambel | 502/413 |
| 1,556,039 | 10/1925 | Shilstone | 502/413 |
| 4,076,616 | 2/1978 | Verde | 210/618 |
| 4,179,374 | 12/1979 | Savage et al. | 210/903 |
| 4,256,573 | 3/1981 | Shimodaira et al. | 210/618 |
| 4,460,292 | 7/1984 | Durham et al. | 405/129 |

FOREIGN PATENT DOCUMENTS 53-100655  9/1978  Japan ................................... 502/437

Primary Examiner—Benoit Castel
Attorney, Agent, or Firm—Dean P. Edmundson

[57] ABSTRACT

Biological stable articles are described which are especially useful as bed materials for treating waste water. Preferred articles are charred rice hulls which comprise silica and carbon.

4 Claims, No Drawings

BIOLOGICAL FILTRATION PROCESS

CROSS-REFERENCES TO RELATED APPLICATION

This application is a continuation-in-part of my copending application Serial No. 06/576,209, filed Feb. 2, 1984, now abandoned.

FIELD OF THE INVENTION

This invention relates to processes and techniques for removing nitrogen compounds and soluble organic compounds from waste waters.

BACKGROUND OF THE INVENTION

It is generally known by those familiar with microbiology that the broad classifications of bacteria are heterotropic (air and water media) and autotropic (only water media). Generally speaking, heterotropic biology are aerobic, fast growing, and can fasten to bed materials, thereby holding their place in flowing water. On the other hand, autotropic biology are slow developing and go with the flow, unless captured or entangled by media, as very thin films on surfaces or in the still water muck.

Heterotrophs utilize readily available natural organic materials for growth and energy. Autotrophs gain energy and growth from the ammonia forms of nitrogen compounds, by oxidizing them to nitrite and nitrate, and use carbon dioxide as the oxidizing agent. Another type of autotroph uses nitrates to oxidize almost any type of organic material for growth and energy and produces nitrogen gas. Other autotrophs utilize sulfate and selenates as oxidizing agents and produce flowers of sulfur or red selenium metal. All types of heterotrophs and autotrophs are widespread in nature and in waste waters of domestic sources.

Normal and conventional practices in the art of water purification involve using separate units to favor heterotropic action and separate units designed to favor autotropic action.

It is generally known by those familiar with rice that the brown rice seed is contained within a hull which is approximately twenty percent silica. This hull is so much a part of the seed that it goes from farm to mill with the grain and, at the mill, it is removed by suitable roller action. Roller action at its best breaks the hull into two equal halves, dropping out the brown rice grain which is usually further polished to white rice. Each half of the hull looks like a tiny canoe, smooth on the inside and covered with uniform blisters on the outside, giving it the appearance of one half of an ear of corn on the outside. With twenty percent silica content, and little else other than cellulose and lignin, the hull has little food value and limited fuel value because of the high ash content. Furthermore, this ash is very fine and is a mucus irritant that will not clinker to aid disposal. When heated above about 1700° F., this silica changes from the opaline form to quartz and crystalbalite.

The literature has many references to controlled burning and closed chamber pyrolysis of rice hulls. Both procedures, however, fail to describe the controlled conditions necessary to gain a high carbon content to the char. Both produce unwanted changes in the silica and both produce unwanted tars and oils in the off gases. In addition, the off gases contain nitrogen, carbon dioxide, nitrogen oxides, sulfur oxides, as well as the more desired hydrogen and carbon monoxide. Even following a most difficult gaseous separation, the hydrogen to carbon monoxide ratio is too low for most synthesis gas purposes. The off gas is therefore of low value as an energy fuel.

It is one object of the invention of my copending application, Ser. No. 06/576,209, incorporated herein by reference, to provide a process that assures that all silica from rice hulls remains in the opaline form, that as much carbon as possible remains in the valuable char, that tars and oils as by-products are eliminated, that nitrogen, carbon dioxide, nitrogen oxides and sulfur oxides do not appear in the off gases, and that the composition of the off gas is four atoms of hydrogen (2 molecules) to one molecule of carbon monoxide. The off gas produced according to such invention is almost exactly the synthesis gas that can be used to produce methyl alcohol by well-known means. While synthesis gas is normally made totally from natural gas, it is a purpose of that invention to gain most of the gas from an economical rice hull source. It is an additional purpose of that invention to make synthesis gas from other sources, namely other agricultural by-products, forest products and peat.

It is an object of this invention to use rice hulls for making a char most suited for an exceptional bio media, and a char most suited for making an exceptional activated carbon for color removal from liquid media. Generally, the practice of this portion of the invention is specific for the organic-color removal for waste water processes reverting the waste water to potable equivalent as specified in Federal Drinking Water Standards. The advantages and the economics realized in attaining clean water from waste water will become apparent from the following description.

It is a further object of this invention to provide a system in which the heterotropic and autotropic systems may be included in a single bed.

Yet another object of the invention is to provide a bed material for excellent biological filter media.

Still another object is to gain biological balances which minimize the bed time for treating waste waters.

SUMMARY OF THE PRESENT INVENTION

In accordance with one embodiment of the present invention there are provided charred rice hulls which are an especially desirable media for a biological filter bed for the reduction of quantities of both organic materials and nitrogen compounds in water sources, waste water plant effluents, and certain industrial process waters. Certain other charred materials are also useful in biological filter beds.

DETAILED DESCRIPTION OF THE INVENTION

The shape and size of a rice hull is usually one-half the cover over a single grain of common rice. Such a hull has an opaline silica content of about twenty percent. When properly charred, a rice hull has a stronger shape than other chars by reason of this high silica content. The charred shape is an opaline silica film covered by rows of truncated pyramids which in turn are covered with char carbon residue.

When wetted out, capillary action holds the charred hull full of still (i.e., non-moving) water, even when water is flowing over the charred hull. The porous nature of the charred hull permits dissolved gases, liquids and solids to transfer at will from flowing water to the still or non-moving water and be utilized by heterotrophs and autotrophs where their colonies enjoy the most suited environment for their livelihoods.

As described in my copending application Ser. No. 06/576,209, incorporated herein by reference, a moving bed of rice hulls is gradually heated (in the absence of oxygen) while a cocurrent stream of a gaseous phase of natural gas and water vapor of proper ratio passes over the bed. When water is in contact with natural gas at about 180° F. sufficient moisture vapor is carried along to best serve the process. Thus, gases enter the bed chamber at 180° F. As the bed is heated beyond this temperature, moisture vapor begins to come from the raw rice hulls at about 220° F. At 400° F. the rice hulls begin to char. At 900° F. tars and oils (as vapors) pour off the rice hull bed to be swept by the gas stream toward even higher temperature zones to avoid all condensation.

At about 1550° F. all charring is nearly completed, but a temperature of about 1650° F. accelerates the finishing of the char-making cycle. It has been found that little, if any, of the silica from the hulls is changed from the opalene form. At 1650° F. the char is dropped from the system and only the gases proceed to higher temperatures. The gases begin to interact at about 2050° F. All carbon containing gases react with water vapor to produce carbon monoxide and hydrogen. The natural gas reacts with water to produce carbon monoxide and hydrogen. The latter is excess over synthesis gas needs in order to make up for the hydrogen deficiency from the rice hull pyrolysis. By adjusting only the natural gas flow rate, exactly 4 hydrogens (2 molecules) and one carbon monoxide molecule can be obtained. As these gases leave the pyrolysis tube, they contain small amounts of impurities from the type and composition of the charged raw materials. The gas stream is first air cooled, then water cooled, then put through a packed bed to defog the gas stream in such a manner that all condensates accumulate in a common basin.

At this point in the process three products have been made: the char, the gases and the condensate. The condensate is a clear, slightly yellowish, liquid with fine shimmering platelets. These platelets comprise a small amount of naphthalene. The off-gases may be used as process fuel to heat the rice hull bed, if desired.

The condensate is almost entirely water, but contains nitrogen as ammonia and contains sulfur as hydrogen sulfide, reflecting exactly the amounts of these items in the raw materials. Disposed on land as irrigation water, some fertilizer benefit is obtained.

The char is about 52 percent carbon, 47+ percent silica and a fraction of a percent other mineral or carbon compounds. The shape of the char particle is its most important property. It looks like a tiny canoe, smooth on the inside and rough like a tiny ear of corn on the outside. Now, however, it is as black as charcoal. When wet with water, capillary action holds the shape full of water. In dry form, its apparent density is about 10 pounds per cubic foot. When wet with water and drained its apparent density is about 30 pounds per cubic foot.

When the char is wet with waste water, after all suspended solids have been removed, the char is a sanctuary for certain microbiology that live off the soluble organic wastes in the water. If air is excluded, then this microbiology is dominated by anaeorbic types and they utilize the nitrates and sulfates as oxygen sources to utilize some of the organic waste materials for their energy needs. If, usually in sequence, air is made available, then the microbiology that dominates the media is aerobic. They leave any nitrates and sulfates present unchanged. They do utilize all the organic waste materials and air for their energy needs. It has been observed that waste waters have some ammonia and that aerobic conditions generate more ammonia from the digestion of soluble protein fractions.

When the pH is normally 8-9 or adjusted to this pH level with air moving through the wet rice hull char the ammonia is reduced from about 15-20 ppm to less than 1 ppm. Rice hull char is a very special media for biological systems. It has been further observed that rice hull char is fully biologically resistant and fully weather-resistant.

Another material which may be used for making char in accordance with this invention is common straw which has been cut to the desired length. Although such type of char does not have as much strength as the rice hull char, it is nevertheless useful in this invention.

A bed of char may be used in different manners. For example, it may be arranged such that waste water flows upwardly through the bed. In another embodiment the waste water may flow downwardly through the bed. In yet another embodiment the waste water may flow upwardly in a manner such that the bed is fluidized (with precaution taken to prevent the char from escaping).

EXAMPLE PROCEDURE

The char, after being properly produced as described above, is placed in a bed suited for bottom influent of filtered waste water and top overflow of effluents. The bed is caused to be saturated with water by removing air from the bed with vacuum. The bed is then washed with fully aerated waste water and then the aerated waste water is caused to flow upward through the bed on a continuous and steady basis.

The influent water of treated sewage has a profound microbiological life, both in absolute numbers and in different types of bacteria. The system has an uncontrolled ammonia compound and organic compound influent which is typical of waste waters. The influent waste water, and also the effluent water, are analyzed to determine the amounts of both organic compounds and nitrogen compounds.

In several tests, strong biological action developed in the bed after 25 to 100 hours. Ammonia content dropped to almost zero and biodegradable organic matter dropped to below a few parts per million. Nitrate analysis of the effluent showed less than ten parts per million. Several measures of total organic carbon, coupled with nitrogen analysis and degradable organic matter content (as measured by biological oxygen demand), showed some consumption of non-biodegradable (refractory) organic compounds.

The techniques of the present invention have been used effectively to treat waste water with the following results:

|  | Influent Water | Effluent Water |
| --- | --- | --- |
| Ammonia | 15–40 ppm. | 0–1 ppm. |
| *B.O.D.$_5$ | 15–30 ppm. | 1–4 ppm. |
| **T.O.C. | 20–35 ppm. | 3–8 ppm. |
| Nitrate | 0–5 ppm. | 5–9 ppm. |

|  | Influent Water | Effluent Water |
|---|---|---|
| Turbidity | 1-5 I.T.U. | 1 I.T.U. |

*Biological oxygen demand
**Total organic carbon

Rice hull char also has some activated carbon effect and will remove color materials for a limited time. It is believed that it removes organic materials by simple absorption, in addition to physically filtering the suspended solids away. In tests performed, usually about half the suspended solids are organic and the B.O.D. is reduced by half the suspended solids reduction.

The rice hull char which is used according to the present invention has very useful properties. In a bed of rice hull char (after fines have been sieved out and the bed has been thoroughly wetTED with water), two distinct conditions exist. The wetting of the char is a combined effect of surface tension and capillary action. The hollow portion of the rice hull shell fills with water and becomes "still" water. Water on the outer surface of the shell is free "flowing" water. The shells are able to absorb oxygen from air and exchange carbon dioxide and solubles with the flowing water.

The "still" water inside the shell is a sanctuary for microbiology throughout the bed. The "still" water is protected from the forces of water flow, light, and settling. Conditions of nocturnal anaerobic and nocturral aerobic are generated. Thus, the rice hull char bed is different functionally from conventional beds of stone, ceramic, or inert plastics because the rice hull char bed is three times more effective on a volume basis and nine times more effective on a weight basis.

The rice hull char bed may also be easily regenerated by washing, drying and then heating. In another variation it may reactivated by washing it with a 10% caustic soda solution, boiling, and washing with clean water.

Other variants are possible within the scope of the present invention.

What is claimed is:

1. A process for biologically removing contaminants from waste water containing organic compounds and ammonia comprising the steps of:
   (a) providing a bed comprising a plurality of biologically stable articles comprising charred rice hulls which have been charred at a temperature in the range of about 1550° F. to 1650° F., each of which has a wall shaped in such a manner that it defines a cavity which is open on one side, wherein said cavity is adapted to retain said water therein when said water flows over the surface of each said article, wherein each said article is adapted to enable dissolved gases and solids in said flowing water to diffuse into said retained water in said cavity, wherein anaerobic microbiology predominates in said retained water, and wherein aerobic microbiology predominates in said flowing water;
   (b) passing said water containing said contaminants over said bed for a period of time sufficient to remove said contaminants from said water.

2. A process in accordance with claim 1, wherein said waste water flows upwardly through said bed.

3. A process in accordance with claim 1, wherein said waste water flows downwardly through said bed.

4. A process in accordance with claim 2, wherein said bed is fluidized.

* * * * *